United States Patent
Williams et al.

(10) Patent No.: US 9,221,365 B2
(45) Date of Patent: Dec. 29, 2015

(54) CONVERTIBLE CHILD SAFETY SEAT ASSEMBLY AND METHOD OF OPERATING THE SAME

(71) Applicant: Wonderland Nurserygoods Company Limited, Central Hong Kong (HK)

(72) Inventors: Bruce L. Williams, Narvon, PA (US); Gregory S. Sellers, Christiana, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/068,081

(22) Filed: Oct. 31, 2013

(65) Prior Publication Data

US 2014/0125099 A1 May 8, 2014

Related U.S. Application Data

(60) Provisional application No. 61/796,121, filed on Nov. 2, 2012.

(51) Int. Cl.
*A47C 1/08* (2006.01)
*A47D 1/10* (2006.01)
*B60N 2/28* (2006.01)
*B60N 2/26* (2006.01)
*B60N 2/32* (2006.01)
*B60N 2/68* (2006.01)

(52) U.S. Cl.
CPC ............. *B60N 2/2821* (2013.01); *B60N 2/286* (2013.01); *B60N 2/2851* (2013.01); *B60N 2/2866* (2013.01); *B60N 2/2875* (2013.01); *B60N 2/26* (2013.01); *B60N 2/28* (2013.01); *B60N 2/32* (2013.01); *B60N 2002/2896* (2013.01); *B60N 2002/684* (2013.01); *Y10T 29/49826* (2015.01)

(58) Field of Classification Search
CPC .............. B60N 2/26; B60N 2/28; B60N 2/32; B60N 2/2896; B60N 2002/2896
USPC ................. 297/250.1, 256.16, 256.13, 256.11
See application file for complete search history.

(56) References Cited

U.S. PATENT DOCUMENTS

| | | | | |
|---|---|---|---|---|
| 4,545,617 A * | 10/1985 | Drexler et al. | ................ | 297/340 |
| 7,237,840 B2 * | 7/2007 | Furui | ......................... | 297/256.1 |
| 7,604,295 B2 * | 10/2009 | Fransen et al. | ........... | 297/256.13 |
| 7,625,043 B2 | 12/2009 | Hartenstine et al. | | |
| 7,857,385 B2 * | 12/2010 | Zink et al. | .................... | 297/256 |

(Continued)

FOREIGN PATENT DOCUMENTS

WO 2009158134 A1 12/2009

OTHER PUBLICATIONS

Official Action from Chinese Patent Application No. 201310532553.7 dated Aug. 4, 2015.

*Primary Examiner* — Chi Q Nguyen
(74) *Attorney, Agent, or Firm* — David I. Roche; Baker & McKenzie LLP

(57) ABSTRACT

A convertible child safety seat assembly includes a seat portion and a removable seatback. The seat portion has a seat portion having an upper surface, and an elongated slot opened on the upper surface. The seatback is affixed with at least one beam that has an elongated shape. The beam has a distal end, and is assembled with a latch movable transversally relative to the beam. The seatback is attached to the seat portion with the beam received in the elongated slot, the distal end engaged under the upper surface, and the latch engaging through a sidewall of the elongated slot.

15 Claims, 6 Drawing Sheets

(56) References Cited

U.S. PATENT DOCUMENTS 8,152,238 B2 * 4/2012 Timme et al. .............. 297/250.1
2011/0181084 A1 * 7/2011 Arnold et al. ............ 297/256.16
2012/0013159 A1 * 1/2012 Williams et al. ......... 297/256.16

* cited by examiner

CONVERTIBLE CHILD SAFETY SEAT ASSEMBLY AND METHOD OF OPERATING THE SAME

CROSS-REFERENCE TO RELATED APPLICATION

This application claims priority to U.S. Provisional Patent Application No. 61/796,121 filed on Nov. 2, 2012, which is incorporated herein by reference.

BACKGROUND

1. Field of the Invention

The present invention relates to convertible child safety seat assemblies suitable for sitting a child in a vehicle.

2. Description of the Related Art

Safety legislations require the use of a child safety seat for seating a young child in a car. For improved safety and comfort, many parents may usually continue to use a child safety seat up to the age of 10 or 12 years. As a result, the parents may typically purchase 3 or 4 different child safety seats during the first 8 to 10 years of the child's development. This may be wasteful, confusing and expensive. To remedy this issue, some convertible child safety seats available on the market may offer the ability to adapt to different ages of the child. In particular, the seatback of certain child safety seat may be removable so as to convert the child safety seat into a booster seat with no seatback that better suits a taller child.

With respect to the convertible child safety seats, there is a need for a mechanism that is cost-effective to implement, and allows easy assembly and disassembly of the seatback for adapting the child safety seat to different ages of the child.

SUMMARY

The present application describes a convertible child safety seat assembly that includes a seat portion and a removable seatback, and a method of operating the child safety seat assembly. The seat portion has a seat portion having an upper surface, and an elongated slot opened on the upper surface. The seatback is affixed with at least one beam that has an elongated shape. The beam has a distal end, and is assembled with a latch movable transversally relative to the beam. The seatback is attached to the seat portion with the beam received in the elongated slot, the distal end engaged under the upper surface, and the latch engaging through a sidewall of the elongated slot.

In some other embodiments, the child safety seat assembly can include a seat portion having an upper surface for seating a child and an elongated slot opened on the upper surface, and a removable seatback. The seatback is affixed with at least one beam that has an elongated shape and is assembled with a latch operable to engage with the seat portion for locking the seatback with the seat portion. The beam is received in the elongated slot when the seatback is assembled with the seat portion, and the beam is removed from the elongated slot when the seatback is detached from the seat portion. The latch is movable transversally relative to the beam between an engaged state where the latch locks the seatback with the seat portion, and a disengaged state where the latch unlocks for removal of the seatback from the seat portion. Furthermore, the latch is also rotatable relative to the beam between a first position where the latch is engaged with an upper surface of the seat portion to block transversal displacement of the latch relative to the beam, and a second position where the latch is disengaged from the upper surface of the seat portion to allow transversal displacement of the latch.

The present application also describes a method of operating a child safety seat assembly including a seat portion and a seatback. The method includes providing a seatback affixed with a beam having an elongated shape, the beam being assembled with a latch, providing a seat portion having an upper surface on which is opened an elongated slot, placing the seatback such that the beam is received in the elongated slot and a distal end of the beam is engaged under the upper surface, and moving the latch transversally relative to the beam until the latch reaches an engaged state where the latch engages through a sidewall of the elongated slot to lock the seatback with the seat portion.

DETAILED DESCRIPTION OF THE EMBODIMENTS

Figure 1:
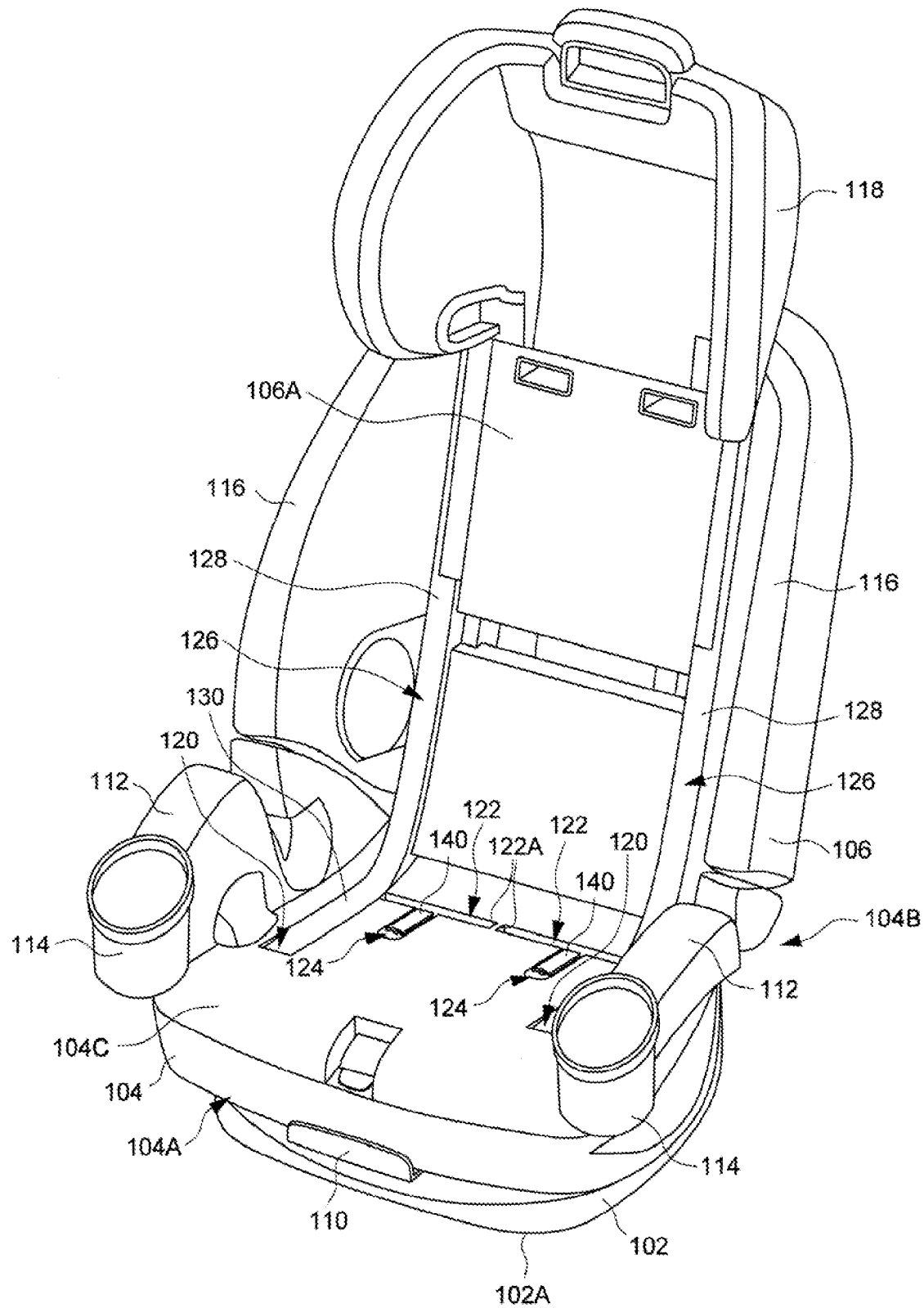
FIG. 1 is a schematic view illustrating an embodiment of a child safety seat assembly.

FIG. 1 is a schematic view illustrating an embodiment of a child safety seat assembly 100. The child safety seat assembly 100 can include a base 102, a seat portion 104 and a seatback 106. The base 102 has a bottom surface 102A that can rest on a vehicle seat. The seat portion 104 can be constructed from a shell body made by plastic molding, and can have a front 104A and a rear 104B. The seat portion 104 is assembled with an upper surface of the base 102, and can be movable relative to the base 102 to adjust an inclination of the seat portion 104. The seat portion 104 can be assembled with a release actuator 110 that is operatively connected with a latch (not shown) operable to lock the seat portion 104 with the base 102. The release actuator 110 can be operable from the front 104A to drive unlocking of the latch so that the seat portion 104 can be adjustable relative to the base 102.

Left and right sides of the seat portion 104 can be provided with armrests 112. In some embodiments, the armrests 112 may be formed integrally with the seat portion 104. In other embodiments, the armrests 112 may be removable from the seat portion 104. Moreover, one or two of the armrests 112 may have a front end provided with a cup holder 114 suitable to receive the placement of a drinking container.

Referring again to FIG. 1, the seatback 106 can be removably assembled with the seat portion 104 at the rear 104B. The seatback 106 can have a shell body made of plastic molding. Left and right sides of the seatback 106 can be provided with lateral wings 116 that project forward to provide increase comfort and protection. Moreover, the seatback 106 can be assembled with a headrest 118. The headrest 118 can be vertically adjusted relative to the seatback 106 to adapt to the height of the child.

In conjunction with FIG. 1, FIGS. 2-5 are schematic views illustrating a construction for removably assembling the seat portion 104 with the seatback 106. The seat portion 104 can have an upper surface 104C on which a child can be seated. The seat portion 104 can include two elongated slots 120 that are opened on the upper surface 104C and extend substantially linear toward the front 104A and the rear 104B of the seat portion 104. The two elongated slots 120 may be disposed at the left and right sides of the seat portion 104 respectively adjacent to the armrests 112. Each of the elongated slots 120 may further have a front end portion 120A (better shown in FIG. 2) that extends below the upper surface 104C.

The upper surface 104C can further include two slit portions 122 that extend along a transversal direction of the seat portion 104, and two recesses 124 transversally spaced apart from each other. The two slit portions 122 can be respectively connected with the two elongated slots 120 and the two recesses 124.

The seatback 106 can be affixed with two beams 126 having an elongated shape. Each of the beams 126 can have a sidewall 126A facing a central region of the seatback 106, and an opposite sidewall 126B facing an outside of the seatback 106. Each of the beams 126 can further have a bent shape that includes a segment 128 affixed with the seatback 106, and another segment 130 toward a lower end of the seatback 106 that bends relative to the segment 128. The segments 128 of the two beams 126 can extend vertically along the seatback 106 respectively adjacent to the lateral wings 116. The segment 130 can extend forward from a front surface 106A of the seatback 106, and terminate into a distal end 132. The beam 126, including the segments 128 and 130, and the distal end 132, can be formed integrally as a unitary tubular part.

Figure 2:
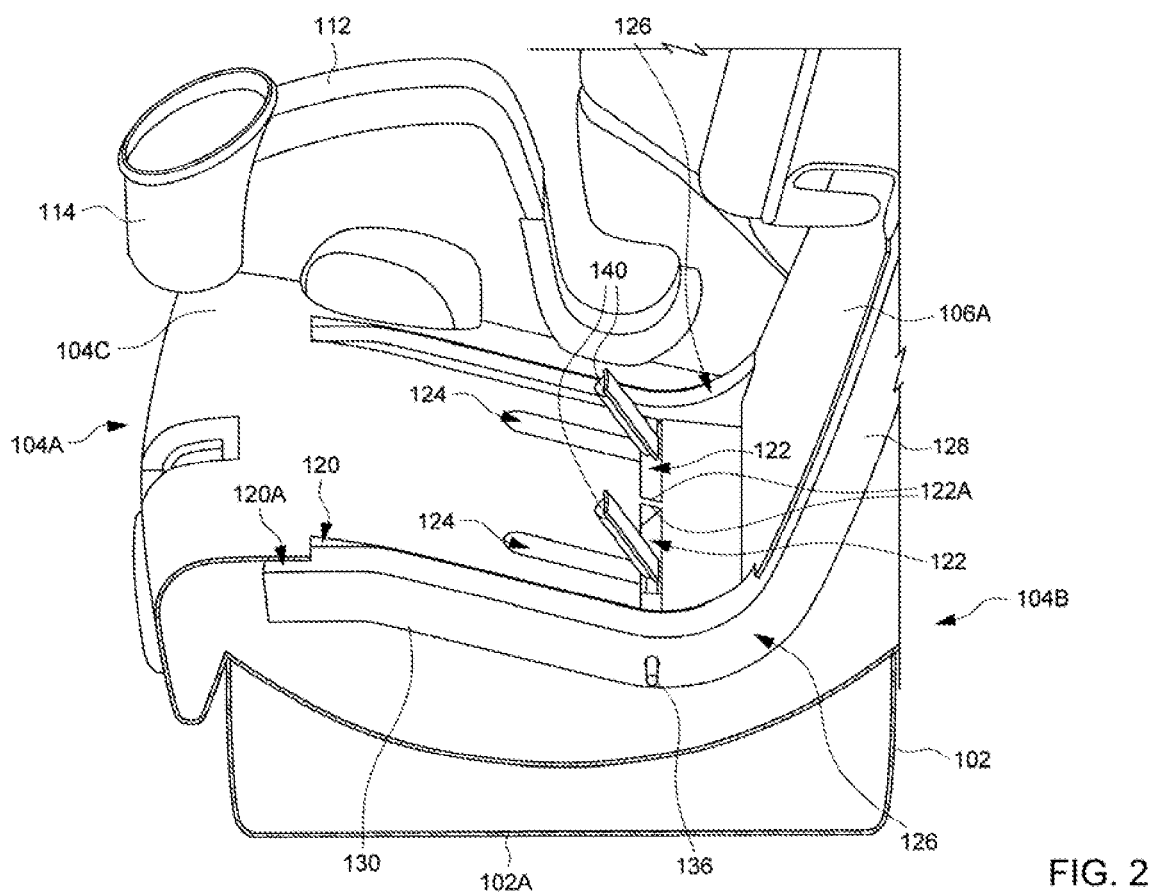
FIG. 2 is a schematic view illustrating a construction for removably assembling a seatback with a seat portion of the child safety seat assembly.
Figure 3:
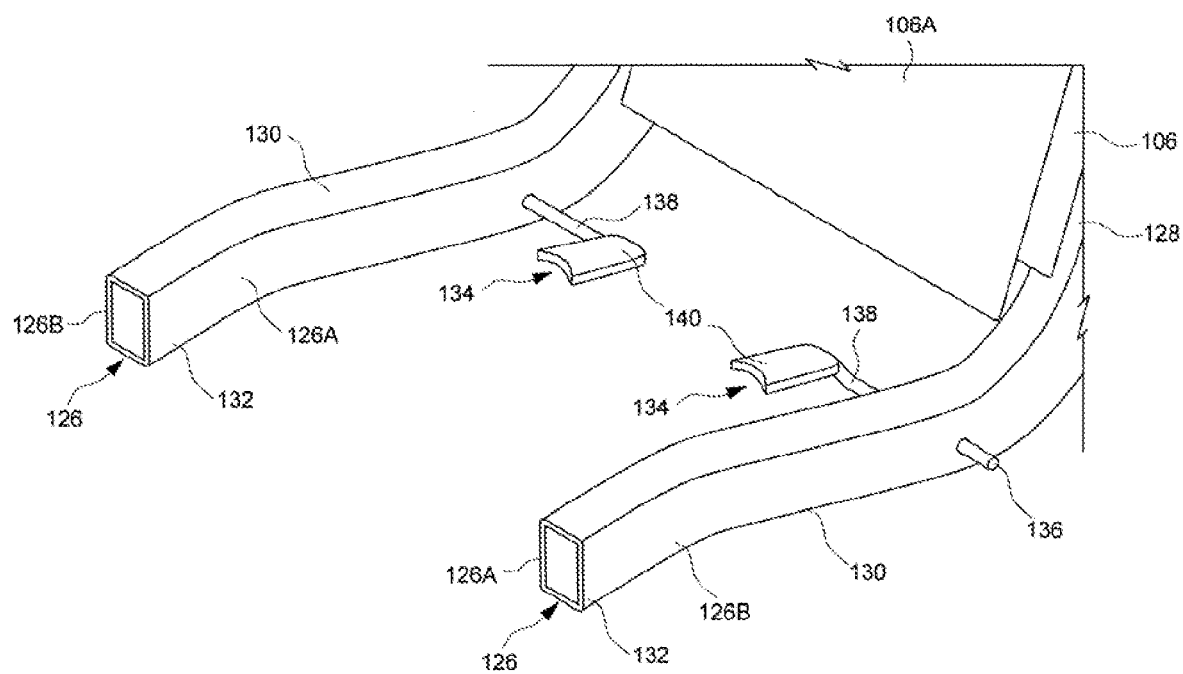
FIG. 3 is a schematic view illustrating a portion of the seatback.
Figure 4:
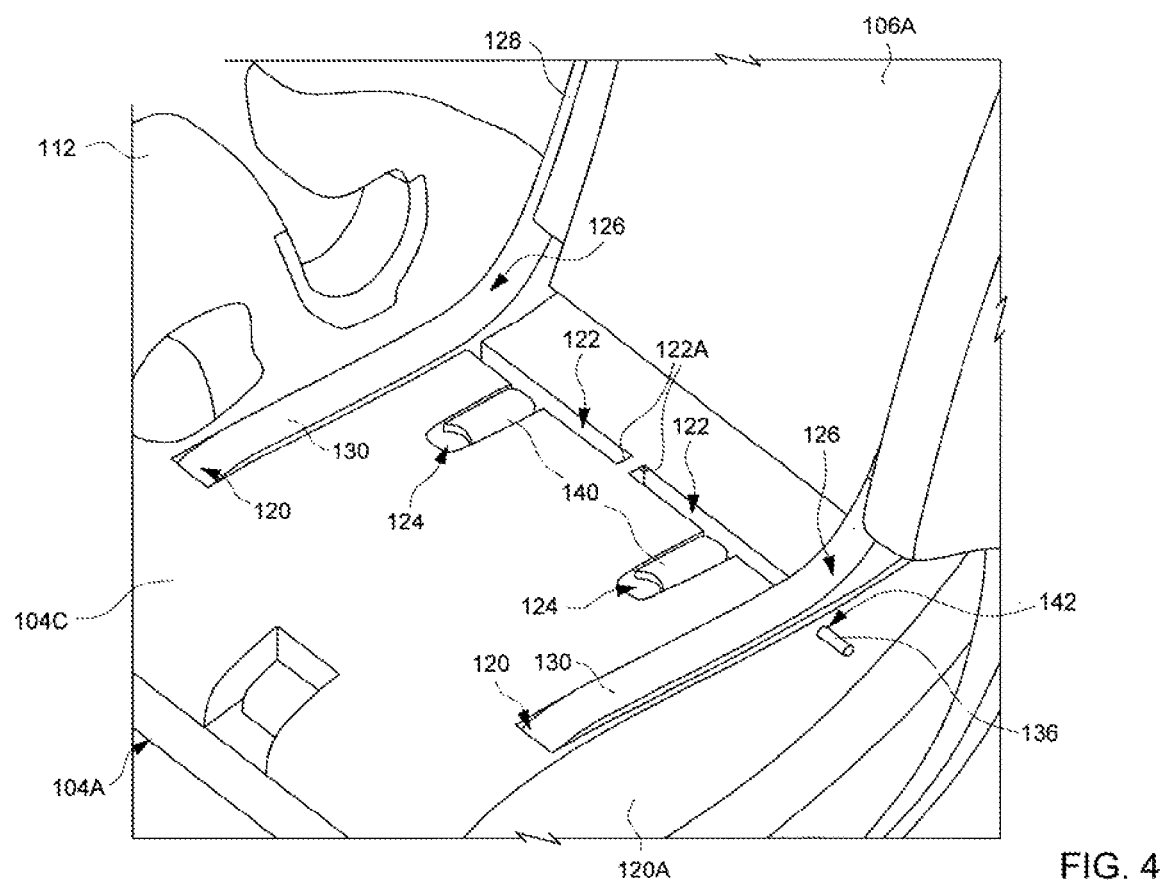
FIG. 4 is a schematic view illustrating the seatback locked with the seat portion.
Figure 5:
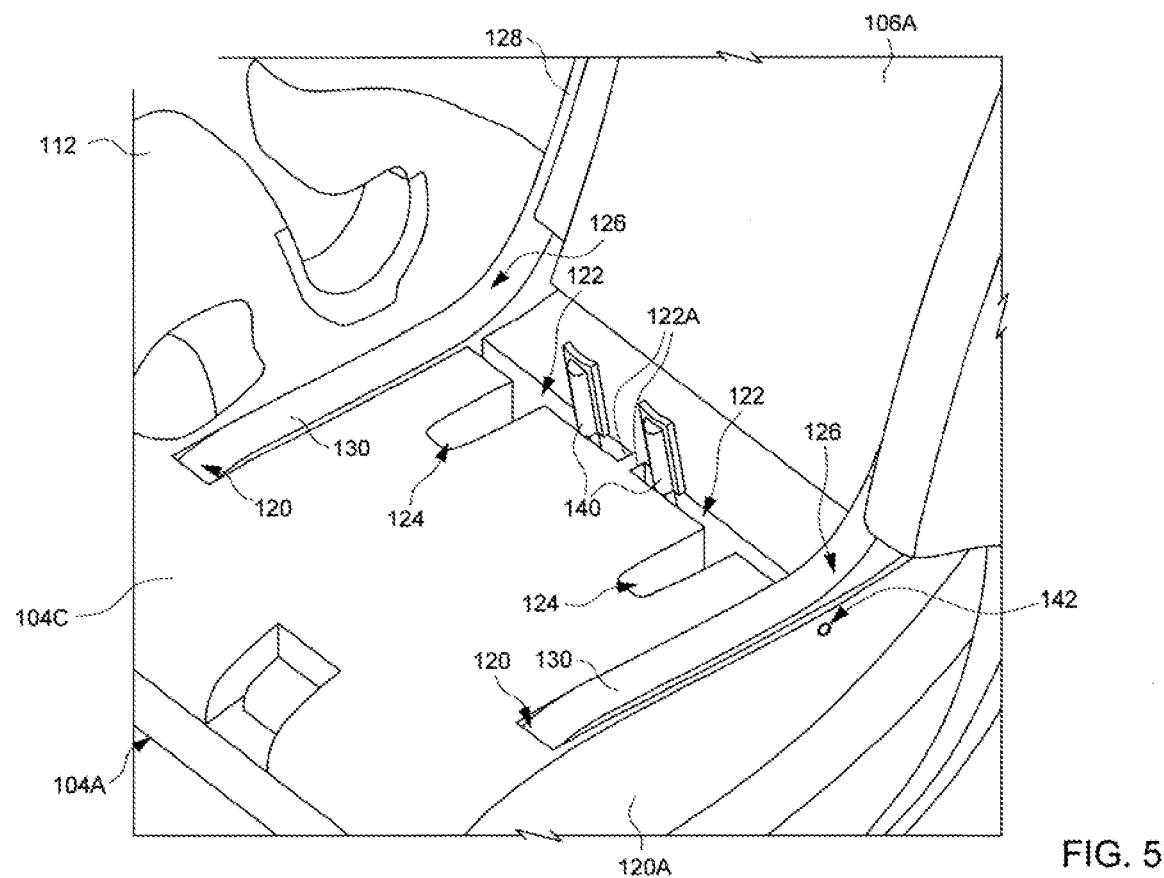
FIG. 5 is a schematic view illustrating latches of the seatback disengaged from an upper surface of the seat portion.

Referring to FIGS. 2-4, each of the beam 126 can be assembled with a latch 134 operable to lock and unlock the seatback 106 with respect to the seat portion 104. The latch 134 can be positioned on the segment 130 near a joining region between the segments 128 and 130. The latch 134 can include a pin 136 that is assembled through the beam 126 along a transversal direction, and can extend outward from the sidewall 126B. The pin 136 can have a segment 138 that extends transversally inward from the sidewall 126A, and is affixed with an actuating portion 140. The actuating portion 140 can be exemplary formed as a tab. However, any shapes may be suitable for the actuating portion 140.

The latch 134 (including the pin 136, the segment 138 and the actuating portion 140) is movable transversally relative to the beam 126 to cause the pin 136 to either extend transversally outward from the sidewall 126B or retract toward the interior of the beam 126, and is also rotatable relative to the beam 126 about a pivot axis extending transversally. More specifically, the latch 134 can slide transversally relative to the beam 126 between an engaged state where it engages with the seat portion 104 to block removal of the beam 126 from the elongated slot 120, and a disengaged state where the latch 134 disengages from the seat portion 104 to allow removal of the beam 126 from the elongated slot 120. Moreover, the latch 134 can rotate relative to the beam 126 between a first position where it engages with the upper surface 104C of the seat portion 104 to block transversal displacement of the pin 136 through the beam 126 and thereby lock the latch 134 in the engaged state, and a second position where the latch 134 disengages from the upper surface 104C of the seat portion 104 to allow transversal displacement of the latch 134 relative to the beam 126.

In some embodiments, each latch 134 may also be coupled with a spring that may urge the latch 134 to move transversally either toward the engaged state or the disengaged state.

For assembling the seatback 106 with the seat portion 104, the beams 126 can be respectively placed in the elongated slots 120 such that the distal ends 132 respectively engage under the upper surface 104C toward the front 104A of the seat portion 104, and the pins 136 of the latches 134 are respectively received in the slit portions 122 of the seat portion 104. The latch 134 of each beam 126 then can be moved transversally away from a central region of the seat portion 104 so that the pin 136 projects outward from the sidewall 126B and engages through an opening 142 formed through a sidewall 120A of the elongated slot 120. The engagement of the latch 134 through the sidewall 120A of the elongated slot 120 can be located toward the rear 104B of the seat portion 104.

The locking engagement of the latch 134 with the seat portion 104 can be reached when the actuating portion 140 is respectively aligned with the position of the corresponding recess 124. While it is in the engaged state, the latch 134 can be rotated relative to the beam 126 toward the upper surface 104C of the seat portion 104 until the actuating portion 140 is received in the recess 124. This engagement of the actuating portion 140 with the upper surface 104C of the seat portion 104 can block transversal displacement of the latch 134 relative to the beam 126. The latch 134 can be thereby locked in the engaged state as shown in FIG. 4 for keeping the seatback 106 fastened with the seat portion 104.

Figure 6:
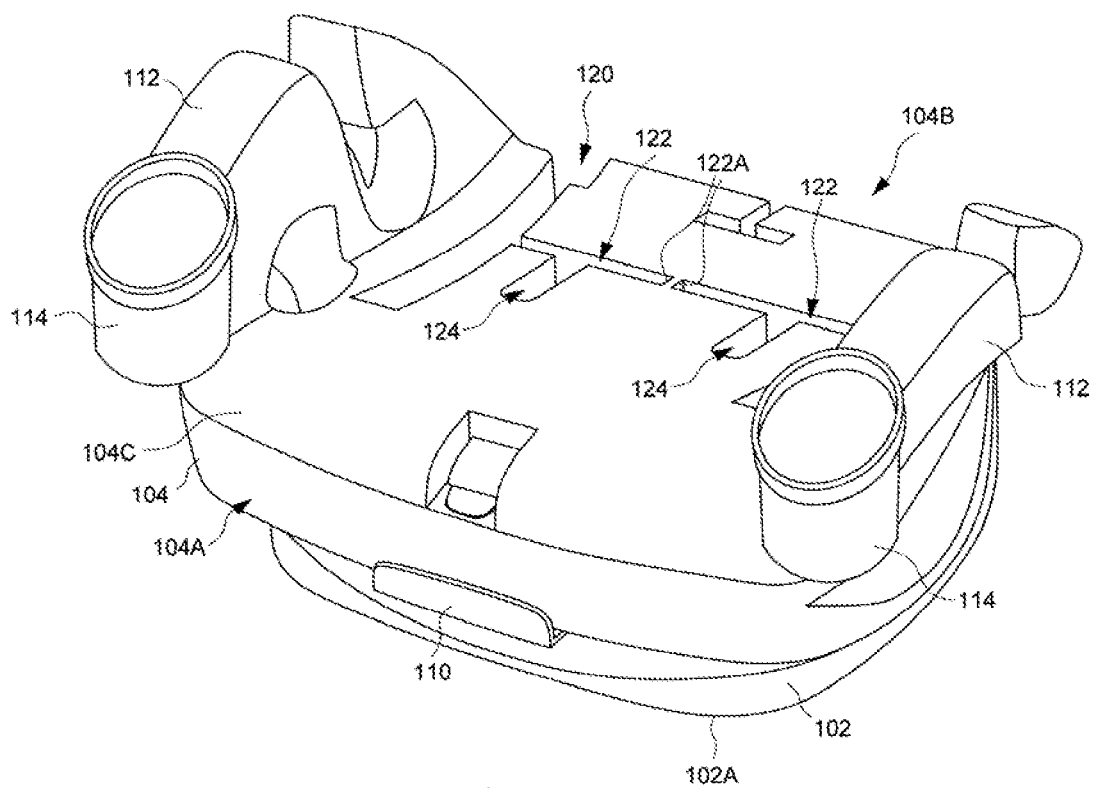
FIG. 6 is a schematic view illustrating a child safety seat assembly configured as a car booster seat without the seatback.

For removing the seatback 106 from the seat portion 104, the actuating portion 140 accessible from the upper surface 104C can be rotated in an upward direction away from the recess 124. This rotation of the actuating portion 140 can also cause concurrent rotation of the pin 136 of the latch 134 relative to the beam 126. Once the actuating portion 140 is disengaged from the upper surface 104C of the seat portion 104, the latch 134 can be moved transversally toward the central region of the seat portion 104 so as to disengage the pin 136 from the sidewall 120A of the elongated slot 120. This unlocking displacement of the latch 134 can also result in misalignment of the actuating portion 140 relative to the recess 124. The transversal displacement of each latch 134 toward the central region of the seat portion 104 can be stopped, e.g., by an inner sidewall 122A of the corresponding slit portion 122. The inner sidewall 122A can delimit a transversal displacement of the latch 134, and may also be used to stop the latch 134 at the correct unlocking position. The unlocked seatback 106 and beams 126 then can be removed from the seat portion 104, which can be used as a booster car seat with no seatback as shown in FIG. 6.

Advantages of the structures and methods described herein include the ability to convert a child safety seat assembly to different configurations according to the size of a growing child. In particular, the child safety seat assembly can include a seatback that can be assembled with a seat portion for seating a younger child, and removed from the seat portion for seating an older child.

Realizations of the child safety seat assemblies have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat assembly comprising:
    a seat portion having an upper surface providing support for a child sitting thereon, and an elongated slot opened on the upper surface;

a removable seatback; and at least one beam that is affixed with the seatback and has an elongated shape, the beam having a distal end and being assembled with a latch movable transversally relative to the beam, the beam further including a first and a second sidewall facing opposite directions, the first sidewall facing a central region of the seat portion, and the latch including a pin movable to extend outward from the second sidewall;

wherein the seatback is attached to the seat portion with the beam received in the elongated slot, the distal end engaged under the upper surface, and the latch engaging through a sidewall of the elongated slot.

2. The child safety seat assembly according to claim 1, wherein the distal end is engaged under the upper surface toward a front of the seat portion, and the engagement of the latch through the sidewall of the elongated slot is located toward a rear of the seat portion.

3. The child safety seat assembly according to claim 1, wherein the latch is further rotatable relative to the beam about a pivot axis extending transversally relative to the beam.

4. The child safety seat assembly according to claim 1, wherein the latch includes a segment that extends outward from the first sidewall, the segment being affixed with an actuating portion.

5. The child safety seat assembly according to claim 4, wherein the upper surface of the seat portion includes a recess, and the latch is rotatable relative to the beam between a first position where the actuating portion is received in the recess, and a second position where the actuating portion is outside the recess.

6. The child safety seat assembly according to claim 5, wherein transversal displacement of the latch relative to the beam is substantially blocked when the actuating portion is received in the recess.

7. The child safety seat assembly according to claim 5, wherein while the actuating portion is disengaged from the recess, the latch is movable transversally relative to the beam to disengage the latch from the sidewall of the elongated slot and allow removal of the beam from the elongated slot.

8. A child safety seat assembly comprising:

a seat portion having an upper surface providing support for a child sitting thereon, and an elongated slot opened on the upper surface;

a removable seatback; and at least one beam that is affixed with the seatback and has an elongated shape, the beam having a distal end and being assembled with a latch movable transversally relative to the beam, wherein the latch is movable transversally relative to the beam between an engaged state where the beam is locked with the seat portion, and a disengaged state where the beam is unlocked from the seat portion for removal of the seatback from the seat portion, and the latch is further rotatable about a transversal pivot axis relative to the beam between a first position where transversal displacement of the latch is blocked by the seat portion, and a second position where transversal displacement of the latch is allowed;

wherein the seatback is attached to the seat portion with the beam received in the elongated slot, the distal end engaged under the upper surface, and the latch engaging through a sidewall of the elongated slot.

9. The child safety seat assembly according to claim 8, wherein the beam has a bent shape including a first portion affixed with the seatback, and a second portion projecting from a forward surface of the seatback.

10. A child safety seat assembly comprising:

a seat portion having an upper surface for seating a child, and an elongated slot opened on the upper surface;

a removable seatback; and at least one beam that is affixed with the seatback and has an elongated shape, wherein the beam is received in the elongated slot when the seatback is assembled with the seat portion, and the beam is removed from the elongated slot when the seatback is detached from the seat portion, the beam being assembled with a latch operable to engage with the seat portion for locking the seatback with the seat portion, the beam further including a first and a second sidewall facing opposite directions, the first sidewall facing a central region of the seat portion, and the latch including a pin and an actuating portion, the pin being movable to extend outward from the second sidewall, and the actuating portion being affixed with the pin and rotatable above the upper surface of the seat portion about a pivot axis extending transversally relative to the beam;

wherein the latch is movable transversally relative to the beam between an engaged state where the latch locks the seatback with the seat portion, and a disengaged state where the latch unlocks for removal of the seatback from the seat portion, and the latch is further rotatable about the pivot axis relative to the beam between a first position where the latch is engaged with the seat portion to block transversal displacement of the latch relative to the beam, and a second position where the latch is disengaged from the seat portion to allow transversal displacement of the latch.

11. The child safety seat assembly according to claim 10, wherein the actuating portion is received in a recess formed on the upper surface of the seat portion when the latch is in the first position, and displaced away from the recess when the latch is in the second position.

12. The child safety seat assembly according to claim 11, wherein the actuating portion is misaligned from the recess when the latch is in the disengaged state.

13. The child safety seat assembly according to claim 10, wherein the beam further includes a distal end that is engaged under the upper surface toward a front of the seat portion when the seatback is attached with the seat portion.

14. The child safety seat assembly according to claim 10, further including a base on which the seat portion is installed, the seat portion being movable relative to the base to adjust an inclination of the seat portion relative to the base.

15. The child safety seat assembly according to claim 10, wherein the latch is movable transversally along a slit portion formed on the upper surface of the seat portion, and the latch when reaching the disengaged state is stopped by an inner sidewall of the slit portion.

* * * * *